April 28, 1936.  P. DUFFING  2,039,071

POWER SWITCH

Filed Sept. 29, 1931  2 Sheets-Sheet 1

WITNESSES:
R. S. Williams
Fred. C. Pelham

INVENTOR
Paul Duffing
BY F. W. Lyle,
ATTORNEY

April 28, 1936. P. DUFFING 2,039,071
POWER SWITCH
Filed Sept. 29, 1931 2 Sheets-Sheet 2
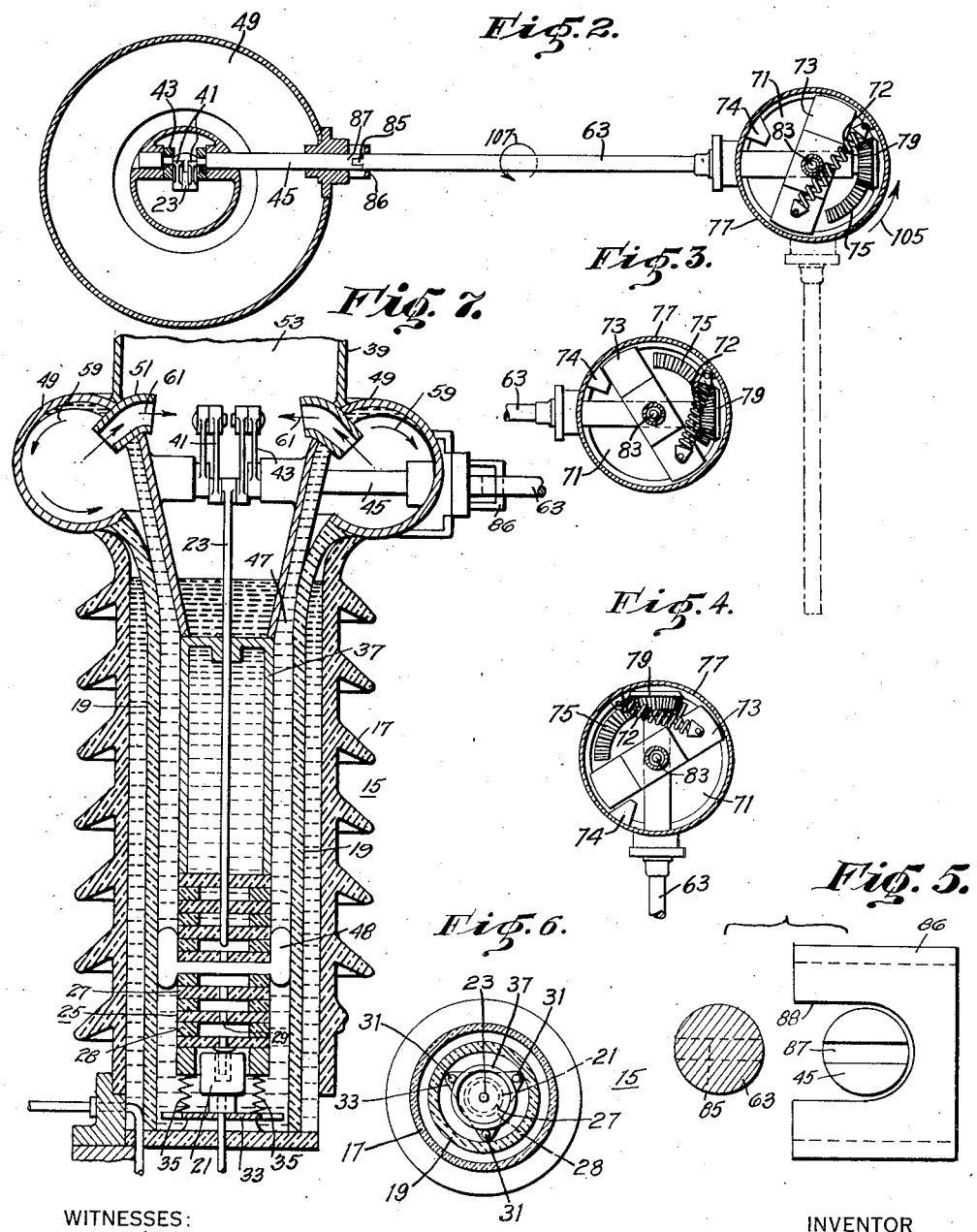
WITNESSES:
INVENTOR
Paul Duffing
BY F. W. Lyle,
ATTORNEY Patented Apr. 28, 1936

2,039,071

UNITED STATES PATENT OFFICE 2,039,071

POWER SWITCH

Paul Duffing, Berlin-Halensee, Germany, assignor to Westinghouse Electric & Manufacturing Company, a corporation of Pennsylvania Application September 29, 1931, Serial No. 565,739
In Germany October 2, 1930

28 Claims. (Cl. 200—48)

My invention relates to switchgear apparatus, such as is used for controlling the flow of electric energy in high tension transmission lines.

An object of my invention is to provide a circuit breaker which is extremely compact and of low cost due to a unique arrangement which materially reduces the amount of insulation required. This is obtained by mounting the circuit breaker in a water-proof insulating casing, thus eliminating the metal tank which has formerly been used and eliminating the need for large insulators between the terminal members and the metal tank and the need for making the tank of large dimensions so as to provide sufficient space between the tank and all live parts.

Another object of my invention is to provide a circuit breaker which is water-proof in construction and in which the operating levers are entirely enclosed, thus making it unnecessary to provide an additional enclosure for protecting the mechanism when mounted outdoors.

A further object of my invention is to provide a circuit breaker in which the operating rod comprises one of the conducting members for connecting the circuit breaker in the electrical circuit and which, in addition, has a separable joint which acts as a disconnecting switch for disconnecting the circuit breaker from the line. This operating rod is mounted on a rotating insulator so that it may be swung as a disconnecting switch blade from open position, to closed position where it makes contact with one circuit breaker terminal. The circuit breaker contacts are then actuated by a further rotation of the insulator column which imparts a movement of rotation to the switch arm about its longitudinal axis to open the contacts of the circuit breaker. This structure is particularly advantageous in that it is equivalent to an interlock mechanism between the disconnecting switch and the circuit breaker, since it is impossible to close the circuit breaker contacts prior to the closing of the disconnecting switch or to open the disconnecting switch prior to the opening of the circuit breaker.

A further object of my invention is to mount instrument transformers of a suitable type within the supporting insulators of the circuit breaker and disconnecting switch. In this way, the separate metal tanks and heavy insulating bushings, which have formerly been used with instrument transformers are made unnecessary.

The switchgear of my invention thus provides a complete switching sub-station which is entirely self-contained within insulator columns which take up very little more space than would be required for a disconnecting switch alone. This gives a most compact structure, which is very economical to manufacture.

These and other objects and advantages of my invention will be further apparent from the detailed description of the specific embodiment of the invention illustrated in the drawings, in which:

Fig. 2 is a sectional view through the apparatus illustrated in Fig. 1 on the line II—II thereof;

Fig. 3 is a sectional view of the mechanism for rotating the switch arm similar to Fig. 2 but showing the mechanism in position after the circuit breaker contacts have been opened, but before the disconnecting switch arm has been opened;

Fig. 4 is a view similar to Fig. 3, but showing the mechanism in position after the disconnecting switch arm has been swung to opened position;

Fig. 5 is a view, partly in section on the line V—V of Fig. 1, of the separable connection between the operating shaft of the circuit breaker and the switch arm at an instant just before engagement;

Fig. 6 is a sectional view through the circuit breaker of Fig. 1 on the line VI—VI thereof; and, Fig. 7 is a diagrammatic view similar to Fig. 1 illustrating the operation of the power circuit breaker.

Figure 1:
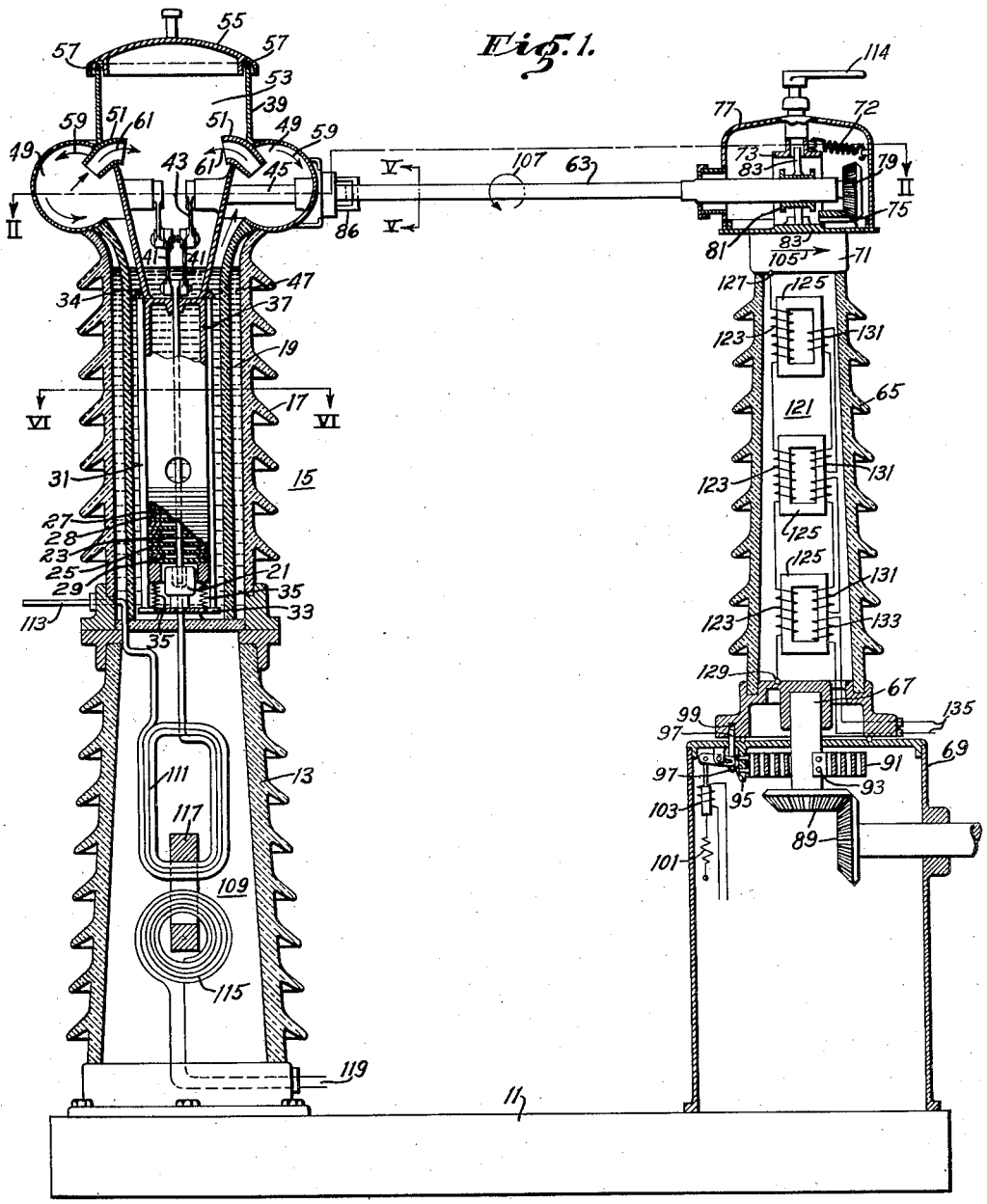
Figure 1 is a sectional view, partially in elevation, of the switchgear embodying my invention, shown in circuit closed position.

Referring particularly to Fig. 1, the switchgear of my invention is provided with a base 11 on which is mounted a supporting insulator 13. A power circuit breaker 15 is mounted on the insulator 13 and comprises a casing 17 of vitreous insulating material, such as porcelain, glass or other insulating material which is water-proof and maintains its dielectric strength when subject to rain, ice and sleet. Within the porcelain insulator column 17 is positioned an inner tube 19 of strong material, such as micarta. A stationary contact member 21 is mounted within the insulating tubes 17 and 19 at the lower end thereof. A contact rod 23 is mounted to be moved longitudinally into and out of engagement with the stationary contact 21.

An arc-extinguishing chamber 25 is provided to extinguish the arc drawn between the separable contacts 21 and 23. This arc-extinguishing chamber may be of any well known type, such as an oil filled explosion pot, an expulsion chamber or a deion grid structure.

In the drawings, an expulsion chamber is illustrated which comprises a plurality of insulating plates 27 having openings 29 through which the movable contact rod 23 is actuated. These plates are spaced apart by insulating washers 28 and the entire stack maintained in alignment by three supporting rods 31 of insulating material which extend from the triangular plate 33 at the lower end of the tubular casing, as shown in Figs. 1 and 6, to the lugs 34 on the housing 39. The plates 27 and washers 28 are held in abutting relation by means of a plurality of coil springs 35 which compress them together against the tubular insulating member 37 which is suspended from the housing 39 mounted on the top of the insulating tubes 17 and 19.

The operating mechanism for moving the contact rod comprises a pair of links 41, the lower ends of which are connected to the upper end of the contact rod 23. The upper ends of the links 41 are connected to a crank 43 on an operating shaft 45, which also acts as one circuit breaker terminal since the electrical connection to the contact rod 23 is through the shaft 45, crank 43 and links 41.

The insulating tubes 17 and 19 are filled with an arc-extinguishing liquid 47 in which the separable contacts and arc-extinguishing chamber are immersed. The liquid 47 may be oil, water or any other suitable arc-extinguishing agent, depending upon the type of arc-extinguishing chamber which is used.

The upper end of the annular space between the tubes 19 and 37 is connected to a gas separating chamber 49 which is formed as part of the housing 39. The gas separating chamber 49 comprises an annular chamber of circular cross-section having short tubes 51 extending thereinto. The outer ends of the tubes 51 direct the gas into the upper chamber 53 and is provided with a cover 55 which is mounted on the upper end of the housing 39 with a joint 57 which has openings allowing the gases to escape.

To operate the circuit breaker, the shaft 45 is rotated, thus separating the movable contact rod 23 from the fixed contact 21. The arc between the separable contacts 21 and 23 decomposes the arc-extinguishing liquid 47 and gas pressure is built up within the chamber 25. As the arc extinguishing liquid is decomposed, a gas bubble is formed in the arc extinguishing chamber and since the gas and liquid is prevented from moving upwardly readily due to the openings 29 in the plates 27 being closed by the moving contact rod 23, the plates 27 are separated against the compression of the springs 35 when the pressure reaches a certain value. As shown in Fig. 7, which illustrates the condition of the circuit breaker at an instant when the arc is being drawn, the gas bubble 48 fills the arc extinguishing chamber below the end of the moving contact rod and forces the liquid out between the separated plates into the space between the tubes 19 and 37 which form an exhaust passage extending from the arc extinguishing chamber. This exhaust passage leads tangentially into the annular chamber 49 and since there is no substantial obstruction to the free rise of the liquid in the exhaust passage between the tubes 19 and 37, the liquid is raised by the expanding gas bubble 48 in the manner shown in Fig. 7. The rising column of liquid in the space between the tubes 19 and 37 has considerable inertia so that it continues to move even during the time of current zero in the alternating-current wave when the amount of gas evolved is small. The liquid thus acts as a fluid piston and causes expansion at the time of current zero to aid in extinction of the arc. The liquid, being heavier than the gas in the annular chamber 49, rotates against the wall of the annular chamber as shown by the arrows 59, and the gas is exhausted from the center of the chamber 49 through the tubes 51 as shown by the arrows 61. The gas finally escapes from the chamber 53 through the opening 57 between the housing 39 and the cover 55. The provision of the strong insulating tube 19 between the arc-extinguishing chamber 25 and the outer porcelain column 17, protects the porcelain from the force of the gas pressure, thus preventing breakage of the porcelain insulator column.

The operating shaft 45 is rotated by means of an arm 63 which is mounted at the top of an insulator column 65. The insulator column 65 is pivoted about an axis 67 on the lower supporting housing 69.

On the top of insulator column 65 is fixedly positioned a head 71 which carries a yoke 73 and a toothed gear segment 75. The switch rod 63 extends through a cap 77 which is rotatably mounted on the head 71 and is provided with a pinion 79 which engages the gear segment 75. The rod 63 is rotatably supported within a collar 81 which is provided with trunnions 83 pivoted between the yoke 73 and the head 71.

A coil spring 72 is connected at one end to the yoke 73 and at the other end to the cap 77, thus biasing the cap 77 and the switch arm 63 which rotates with the cap to follow the yoke 73 after it hits the stop 74 fixed within the cap 77, as shown in Figs. 2, 3 and 4.

The outer end of the switch arm 63 is provided with a projecting blade portion 85 which engages a contact slot 87 in the outer end of the operating shaft 45 of the circuit breaker 15, thus coupling the two rods mechanically for transmitting motion to actuate the separable contacts of the circuit breaker, and electrically to connect the circuit to the line.

A shield 86 having a slot 88 extending thereinto from one side only, as shown in Fig. 5, is mounted on the housing 39 with the end of the shaft 45 aligned with the slot 88 and guides the end of the contact rod 63 into engagement with the contact slot 87 and prevents the contact rod from being swung to open position, except when the shaft 45 is positioned so that the slot 87 is horizontal, in which position the circuit breaker contacts are open. The shield 86 also protects the separable joint from the elements and prevents the formation of ice thereon.

The insulator column 65 is rotated about the axis 67 to close the circuit breaker through a pair of gears 89 which may be connected to any suitable type of hand or electrically-operated closing mechanism. A spiral spring 91 has one end fixed to the axis 67 at 93 and the other end to a fixed projection 95 of the supporting housing 69. The spiral spring 91 is wound in such a direction that energy is stored therein during the motion to close the circuit interrupting contacts. The circuit interrupter is held in closed position by a latch 97 which engages an opening 99 on the base member of the rotating insulator 65. The latch 97 is biased to latched position by a spring 101. To open the circuit interrupter, the latch 97 is withdrawn from the opening 99 by means of a solenoid 103. The electrical circuit to the solenoid 103 may be controlled by any suitable hand-operated switch or by means of a relay which energizes the solenoid upon the existence of predetermined electrical conditions in the main circuit to be interrupted.

A current transformer 109 is mounted in the supporting insulator 13. The current transformer is of a type which has one end at line potential and the other end at ground potential, thus making it possible to mount it within the supporting insulator for the circuit breaker 15 without destroying the insulation between the lower terminal of the circuit breaker and ground. The current transformer 109 comprises a primary coil 111 having one end connected to the stationary contact 21 and the other end connected to the main line terminal 113. A secondary coil 115 is linked with the primary coil 111 by means of a core 117 of magnetic material. The leads 119 from the secondary coil 115 may be connected to suitable indicating instruments or relays as may be desired.

A potential transformer 121 is mounted within the pivoted insulator column 65. A plurality of primary coils 123 are electrically connected in series and are wound each on one leg of a magnetic core member 125. One end of the coils 123 is electrically connected at 127 to the metallic cap 71 which is electrically at the potential of the line terminal 114 and the other end is connected at 129 to the metal base of the insulator which is in contact with the supporting housing 69 which is at ground potential. The voltage impressed across the primary coils 123 is, therefore, equal to the voltage from line to ground. Pairs of the secondary coils 131 are connected together in series, on the other legs of the cores 125, thus coupling the transformers together. The secondary voltage is taken from leads 135 of secondary coil 133.

The operation of the circuit interrupter is as follows:

When the circuit interrupter is in the closed position shown in Figs. 1 and 2, and the solenoid 103 is energized, the latch 97 is withdrawn from the opening 99, thus allowing the pivoted insulator to be rotated by means of the spiral spring 91 in a counter-clockwise direction when looking down on the circuit interrupter, as shown by the arrows 105 in Figs. 1 and 2. This motion of the cap 71 on the top of insulator 65 rotates the yoke 73 and the gear segment 75 which causes the rotation of the pinion 79 and the switch arm 63 about its longitudinal axis in the direction indicated by arrow 107. The rotation of the arm 63 rotates the circuit breaker operating shaft 45 and separates the contact members 21 and 23 through crank 43 and links 41. When the separable contacts are in their fully opened position, the slot 87 and blade 85 are in a horizontal position, so that the switch arm 63 may be swung laterally. At this time, the yoke 73 hits stop 74 and is held thereagainst by spring 72. This intermediate position of the mechanism where the circuit breaker contacts are open and the disconnecting switch arm is still in contact with the circuit breaker terminal is illustrated in Fig. 3. Further rotation of insulator column 65 by spiral spring 91 then rotates the housing 77 and the arm 63 to the open position shown in Fig. 4.

The closing movement of the circuit interrupter is just the reverse of the opening movement. The insulator column 65 is rotated clockwise carrying the switch arm 63 from the position shown in Fig. 4 to the position shown in Fig. 3 where the blade 85 on the end of the switch arm 63 has engaged the contact slot 87 on the operating shaft 45. During this portion of the movement, the contact rod is held in fixed relation to the yoke and gear segment, since the tension spring 72 biases the yoke 73 against the stop 74. When the blade 85 engages the slot 87, further lateral movement of the switch blade is prevented and the continued rotation of yoke 73 carries it from the position shown in Fig. 3 away from the stop 74 against tension spring 72. This movement of the gear segments 75 rotates pinion 79 to rotate arm 63 and shaft 45 and closes the circuit breaker contacts.

It is thus seen that it is impossible to open the disconnecting switch until after the circuit breaker contacts have been separated and that the circuit breaker contacts cannot be closed unless the disconnecting switch is closed. This makes it impossible to open the disconnecting switch, which does not have sufficient interrupting capacity to open the power circuit, except when the circuit breaker is opened first to interrupt the flow of current.

By placing the circuit breaker 15 in the porcelain column 17 and operating it through the disconnecting switch arm 63, and mounting the whole structure on the pair of insulator columns 13 and 65 enclosing the instrument transformers with one of the columns transmitting the motion for opening both the circuit breaker and disconnecting switch, the amount of high voltage insulation required is reduced to a minimum, since all that is required is the column 13 insulating the line terminal 113 and stationary contact 21 from ground, column 65 insulating the other line terminal 114 from ground, and the column 17 insulating the circuit breaker contacts from each other when in open position.

From the above description of the embodiment of my invention illustrated in the drawings, it is apparent that the single structure of my invention provides a complete switching sub-station which can be mounted outdoors without any additional protective housing due to the fact that the parts are all mounted within the porcelain insulator columns and the metal cap members. This arrangement is most advantageous in that it requires a minimum of space and the use of much less insulation than was formerly required where the circuit breaker, disconnecting switch, current transformer and voltage transformer were all separately mounted and insulated.

While a specific structure has been shown, in order to illustrate my invention, it is to be understood that various modifications may be made without departing from the spirit of the invention, as defined by the following claims.

I claim as my invention:

1. In electrical apparatus, supporting means, a tubular outer casing of insulating material mounted on said supporting means, a stationary contact member within said tubular casing adjacent one end thereof, a contact rod movable within said tubular casing into engagement with said contact member, a body of arc extinguishing liquid in said tubular casing, a housing mounted on the said tubular casing of insulating material and forming a chamber extending above said body of liquid, and operating means in said housing for moving said contact rod, said operating means having a shaft rotatable about its longitudinal axis and extending through one wall of the housing.

2. In electrical apparatus, supporting means, a tubular outer casing of vitreous insulating material mounted on said supporting means, a stationary contact member within said tubular casing, a contact rod movable within said tubular casing into engagement with said contact member, an arc-extinguishing device for the arc drawn by said contact member, a tube of insulating material between said arc-extinguishing device and said tubular outer casing of vitreous insulating material, a body of liquid in said tubes, a housing mounted on the said tubular casing, said housing providing a chamber having a portion above the level of said liquid, a linkage mechanism enclosed in said housing for moving said contact rod, and a vent in said housing above the level of said liquid.

3. In electrical apparatus, a power circuit breaker including a pair of separable contacts, a movable shaft for actuating said circuit breaker contacts, one end of said shaft having contact means electrically connected in circuit with said circuit breaker contacts, a pivoted insulator column having a switch arm mounted thereon, means for rotating said insulator column about said pivot and swinging said arm into engagement with the contact means on said shaft to complete the electrical circuit to said circuit breaker contacts, and means for rotating said arm about its longitudinal axis by a further rotation of said insulator column about its pivot to rotate said shaft to close said circuit breaker contacts.

4. In electrical apparatus, a power circuit breaker including a pair of separable contacts, and a conducting actuating member for said contacts electrically connected in series therewith, a pivoted insulator column, an arm mounted on said insulator column, means for rotating said insulator column for causing said arm to swing about the pivot of said insulator column into engagement with said conducting actuating member, and means for thereafter rotating said arm about its longitudinal axis to actuate said separable contacts.

5. In electrical apparatus, a power circuit breaker including a pair of separable contacts, and a conducting actuating member for said contacts electrically connected in series therewith, a pivoted insulator column, an arm mounted on said insulator column, means for rotating said insulator column for causing said arm to swing into engagement with said conducting actuating member to close said contacts, means biasing said contacts to move to separated position and biasing said arm to move out of engagement with said conducting actuating means to open the circuit to said contacts, and means releasable to cause said biasing means to both separate said contacts and move said arm out of said engagement.

6. In electrical apparatus, a pair of insulator columns, a disconnecting switch contact mounted on one of said columns, a disconnecting switch arm mounted on said other insulating column and movable into engagement with said contact, and a power circuit breaker mounted within one of said insulator columns and electrically connected in series with said contact and switch arm, said insulator column in which the power circuit breaker is mounted forming the outer casing for the power circuit breaker and an instrument transformer mounted in at least one of said insulator columns and electrically connected to the circuit through said contact and switch arm.

7. In electrical apparatus, a supporting insulator column, a power circuit breaker including a pair of separable contacts and a chamber for extinguishing the arc drawn between said separable contacts mounted on said supporting insulator, an outer casing of vitreous insulating material enclosing said contacts and said chamber, a movable member of insulating material for actuating said separable contacts, and an instrument transformer in said supporting insulator column and electrically connected to the circuit through said separable contacts.

8. In electrical apparatus, a supporting insulator column, a second insulator column mounted on said supporting insulator column, a power circuit breaker having a pair of separable contacts electrically connected to a pair of terminal members, said second insulator column enclosing said power circuit breaker and forming an outer casing therearound, and an insulator column having a disconnecting switch arm mounted thereon, means for moving said switch arm into and out of engagement with one of said circuit breaker terminal members to open and close the electrical circuit thereto, a mechanical connection between said switch arm and said separable contacts completed by engagement of said switch arm with said terminal whereby further movement of said switch arm actuates said contacts, a current transformer mounted in one of said insulator columns and connected in series with the circuit through said circuit breaker and disconnecting switch arm, and a potential transformer mounted in another of said insulator columns and connected to said circuit.

9. In electrical apparatus, a supporting insulator column, a second insulator column mounted on said supporting insulator column, a power circuit breaker having a pair of separable contacts electrically connected to a pair of terminal members, said second insulator column enclosing said power circuit breaker and forming an outer casing therearound, one of said terminal members comprising means for transmitting motion to actuate said circuit breaker contacts, and an insulator column having a disconnecting switch arm mounted thereon, means for moving said switch arm into and out of engagement with one of said circuit breaker terminal members to open and close the electrical circuit thereto, means for further moving said switch arm to move said terminal member and thereby actuate said circuit breaker contacts, means causing said circuit breaker contacts to be in open position whenever said disconnecting switch arm is separated from said terminal member, a current transformer mounted in one of said insulator columns and connected in series with the circuit through said circuit breaker and disconnecting switch arm, and a potential transformer mounted in another of said insulator columns and connected to said circuit.

10. In electrical apparatus, a circuit interrupter including separable contact members for drawing the arc, an arc extinguishing chamber around said contact members and an arc extinguishing liquid in said chamber, an annular chamber above the top of said liquid having a vent extending from the center portion to the outside thereof, and an exhaust passage extending from said arc extinguishing chamber and leading into said annular chamber substantially tangentially thereto.

11. In electrical apparatus, a circuit interrupter including a contact rod movable to draw the arc, an arc extinguishing chamber surrounding the path where the arc is drawn, and having therein an arc extinguishing liquid, said arc extinguishing structure including a plurality of plates having openings through which the contact rod is movable, said plates restricting movement of the arc extinguishing liquid and the arc gases along the moving contact rod and being separably mounted permitting lateral flow of the arc extinguishing liquid and arc gases from the chamber, and an elongated exhaust passage extending from adjacent said separably mounted plates to a point out of said liquid, said exhaust passage being normally partially filled with said arc extinguishing liquid and permitting it to freely rise therein when the arc is drawn.

12. In electrical apparatus, a circuit interrupter including a contact rod movable to draw the arc, an arc extinguishing chamber surrounding the path where the arc is drawn, and having therein an arc extinguishing liquid, said arc extinguishing structure including a plurality of plates having openings through which the contact rod is movable, said plates restricting movement of the arc extinguishing liquid and the arc gases along the moving contact rod and being separably mounted permitting lateral flow of the arc extinguishing liquid and arc gases from the chamber, and an elongated exhaust passage extending from adjacent said separably mounted plates, said exhaust passage being normally only partially filled with said arc extinguishing liquid and permitting it to freely rise therein when the arc is drawn, and a chamber at the end of said exhaust passage, said chamber being annularly shaped to cause the liquid to flow in an annular path.

13. In electrical apparatus, a circuit interrupter including a contact rod movable to draw the arc, an arc extinguishing chamber surrounding the path when the arc is drawn, and having therein an arc extinguishing liquid, said arc extinguishing structure including a plurality of plates having openings through which the contact rod is movable, said plates restricting movement of the arc extinguishing liquid and the arc gases along the moving contact rod and being separably mounted permitting lateral flow of the arc extinguishing liquid and arc gases from the chamber, and an elongated exhaust passage extending from adjacent said separably mounted plates, said exhaust passage being normally only partially filled with said arc extinguishing liquid and permitting it to freely rise therein when the arc is drawn, and a chamber at the end of said exhaust passage, said chamber being annularly shaped to cause the liquid to flow in an annular path, and a vent tube extending from adjacent the central portion of said annular path to the outside of the chamber.

14. In a circuit interrupter, an outer casing comprising a tubular member of vitreous insulating material, a pressure resisting casing comprising a tubular member of strong insulating material positioned within and spaced from said outer casing of vitreous insulating material, means within said pressure resisting casing dividing it into a chamber in which the arc is drawn and a vent passage extending along the inside of the pressure resisting casing to one end thereof, a body of arc extinguishing liquid in said pressure resisting casing, means permitting flow of said arc extinguishing liquid and the arc products from the chamber in which the arc is drawn into said vent passage at least while the arc is being extinguished, and a chamber above the level of said liquid into which said vent passage between the arc chamber and the wall of the pressure resisting casing directs the arc products to flow.

15. In a circuit interrupter, an outer casing comprising a tubular member of vitreous insulating material, a pressure resisting casing comprising a tubular member of strong insulating material positioned within and spaced from said outer casing of vitreous insulating material, means within said pressure resisting casing dividing it into an arc chamber and a vent passage extending along the inside of the pressure resisting casing to one end thereof, a pair of relatively movable contacts for establishing the arc in said arc chamber, a body of arc extinguishing liquid in said arc chamber, means permitting flow of said arc extinguishing liquid and the arc products from the arc chamber into said vent passage, a metal housing adjacent one end of said tubular member of vitreous insulating material, a linkage mechanism in said housing for actuating said relatively movable contacts, said housing forming a chamber having a portion above the level of said body of arc extinguishing liquid, and said vent passage extending along the inside of the pressure resisting casing having one end open into the chamber formed by said housing.

16. In a circuit interrupter, an outer casing comprising a tubular member of vitreous insulating material, a pressure resisting casing comprising a tubular member of strong insulating material positioned within and spaced from said outer casing of vitreous insulating material, means within said pressure resisting casing dividing it into an arc chamber and a vent passage extending along the inside of the pressure resisting casing to one end thereof, a pair of relatively movable contacts for establishing the arc in said arc chamber, a body of arc extinguishing liquid in said arc chamber, means permitting flow of said arc extinguishing liquid and the arc products from the arc chamber into said vent passage, a metal housing adjacent one end of said tubular member of vitreous insulating material, a linkage mechanism in said housing for actuating said relatively movable contacts, said housing forming a chamber having a portion above the level of said body of arc extinguishing liquid, a shaft rotatable about its longitudinal axis extending through one wall of said housing above the level of said body of liquid for actuating said linkage mechanism for the contacts, and said chamber formed by the housing being connected to the end of said vent passage extending along the inside of the pressure resisting casing to permit flow of fluid from the arc chamber into said chamber formed by the housing and venting means through the wall of the housing to the outside thereof to permit escape of the gases formed by the arc.

17. In electrical apparatus, an insulator column, a hollow tubular outer casing of insulating material supported on said insulator column, a power circuit breaker mounted within said hollow tubular casing and including a movable contact for drawing the arc and a structure for aiding in extinguishing the arc, a metal housing on said hollow tubular casing, a mechanism including a plurality of pivoted links for changing rotary motion into a substantially straight-line motion, said mechanism being positioned in said metal housing and actuating said movable contact to move longitudinally of said hollow tubular casing, a shaft rotatable about its longitudinal axis extending through one wall of said housing to actuate said linkage mechanism, and means for rotating the outer end of said shaft including a movable member of insulating material for providing insulation between said linkage mechanism and ground.

18. In electrical apparatus, an insulator column, a hollow tubular outer casing of insulating material supported on said insulator column, a power circuit breaker mounted within said hollow tubular casing and including a movable contact for drawing the arc and a structure for aiding in extinguishing the arc, a body of arc extinguishing liquid in said hollow tubular casing, a metal housing on said hollow tubular casing, said housing having a portion extending above the level of said body of arc extinguishing liquid to provide a gas-filled chamber above the liquid, a mechanism including a plurality of pivoted links for changing rotary motion into a substantially straight-line motion, said mechanism being positioned in said metal housing and actuating said movable contact to move longitudinally of said hollow tubular casing, a shaft rotatable about its longitudinal axis extending through one wall of said housing to actuate said linkage mechanism, said shaft extending through said wall at a point above the level of said body of arc extinguishing liquid, and means for rotating the outer end of said shaft including a movable member of insulating material for providing insulation between said linkage mechanism and ground.

19. In electrical apparatus, a supporting insulator in the form of a hollow tube, a hollow tubular casing of insulating material mounted on said supporting insulator, a power circuit breaker including a pair of separable contacts and means for aiding in extinguishing the arc mounted in said hollow tubular casing, a body of arc extinguishing liquid in said hollow tubular casing, a liquid-tight partition for preventing flow of liquid from said hollow tubular casing into the space within said supporting insulator, and a mutual impedance device for supplying a small amount of energy at low voltage for producing an effect substantially proportional to an electrical condition of the circuit through the circuit breaker, said mutual impedance device being mounted within said supporting insulator.

20. In electrical apparatus, a supporting insulator in the form of a hollow tube, a hollow tubular casing of insulating material mounted on said supporting insulator, a power circuit breaker mounted within said hollow tubular casing and including a movable contact for drawing the arc and a structure for aiding in extinguishing the arc, a metal housing on said hollow tubular casing, a mechanism including a plurality of pivoted links for changing rotary motion into a substantially straight-line motion, said mechanism being positioned in said metal housing and actuating said movable contact to move longitudinally of said hollow tubular casing, a shaft rotatable about its longitudinal axis extending through one wall of said housing to actuate said linkage mechanism, and means for rotating the outer end of said shaft including a movable member of insulating material for providing insulation between said linkage mechanism and ground, and a mutual impedance device for supplying a small amount of energy at low voltage for producing an effect substantially proportional to an electrical condition of the circuit through the circuit breaker, said mutual impedance device being mounted within said supporting insulator.

21. In electrical apparatus, a circuit interrupter including an outer casing comprising a tubular member of vitreous insulating material, a pressure resisting casing comprising a tubular member of strong insulating material positioned within and spaced from said outer casing of vitreous insulating material, means within said pressure resisting casing dividing it into a chamber in which the arc is drawn and a vent passage extending along the inside of the pressure resisting casing to one end thereof, a body of arc extinguishing liquid in said pressure resisting casing, means permitting flow of said arc extinguishing liquid and the arc products from the chamber in which the arc is drawn into said vent passage at least while the arc is being extinguished, a chamber above the level of said liquid into which said vent passage between the arc chamber and the wall of the pressure resisting casing directs the arc products to flow, and means for supporting and insulating the circuit interrupter from ground including a hollow column of vitreous insulating material, a liquid-tight partition for preventing flow of liquid from said pressure resisting casing into the hollow supporting insulator column, and a current transformer mounted within said hollow supporting insulator column and connected to the circuit through the circuit interrupter.

22. In a circuit interrupter, an outer casing including a tubular outer member of insulating material, a contact member movable longitudinally within said tubular outer member of insulating material for drawing the arc therewithin, means of insulating material positioned within said tubular outer member of insulating material and surrounding said movable contact for aiding in extinguishing the arc drawn thereby, a body of arc extinguishing liquid within said outer casing with a space above the level thereof, said means of insulating material directing the arc products and said liquid to flow laterally of the arc and then into said space above the level of said liquid, and a vent through said outer casing from said space above the level of said liquid.

23. In a circuit interrupter, an outer casing including a tubular outer member of vitreous insulating material, an inner tubular member of strong insulating material extending along substantially the whole length of said outer member of vitreous insulating material, a contact member movable longitudinally within said inner tubular member for drawing the arc therewithin, a body of arc extinguishing liquid within said inner tubular member with the level thereof below the top of said outer casing, means within said inner tubular member providing a vent passage extending longitudinally along the length of the inner tube, and means permitting flow of fluid from said contact for drawing the arc laterally into said vent passage and then longitudinally into the space above the level of said arc extinguishing liquid.

24. In a circuit interrupter, an outer casing comprising a tubular member of insulating material, a line terminal for the circuit interrupter adjacent one end of said outer tubular member of insulating material, an insulator column supporting said end of the outer tubular member of insulating material and insulating said line terminal from ground, an inner tubular member of strong insulating material positioned within the outer tubular member of insulating material and extending for substantially the whole length thereof, a body of arc extinguishing liquid within said inner tubular member, a metal housing at the end of said tubular members opposite the aforesaid line terminal, said metal housing providing a chamber having a portion above the level of said body of liquid, means of insulating material within said inner tubular member dividing it longitudinally into an arc chamber and a vent passage, means for establishing the arc in the arc chamber and said vent passage extending substantially the whole length of said inner tubular member and into the chamber provided by the metal housing.

25. In a circuit interrupter, an outer casing comprising a tubular member of insulating material, a line terminal for the circuit interrupter adjacent one end of said outer tubular member of insulating material, an insulator column supporting said end of the outer tubular member of insulating material and insulating said line terminal from ground, an inner tubular member of strong insulating material positioned within the outer tubular member of insulating material and extending for substantially the whole length thereof, a body of arc extinguishing liquid within said inner tubular member, a metal housing at the end of said tubular members opposite the aforesaid line terminal, said metal housing providing a chamber having a portion above the level of said body of liquid, means of insulating material within said inner tubular member dividing it longitudinally into an arc chamber and a vent passage, means for establishing the arc in the arc chamber and said means of insulating material permitting flow of fluid laterally in the tubular member from the arc chamber into the vent passage, and said vent passage extending substantially the whole length of said tubular member and into the chamber provided by said metal housing, and a vent opening from said metal housing above the level of the liquid therein.

26. In a circuit interrupter, an outer casing comprising a tubular member of insulating material, a line terminal for the circuit interrupter adjacent one end of said outer tubular member of insulating material, an insulator column supporting said end of the outer tubular member of insulating material and insulating said line terminal from ground, an inner tubular member of strong insulating material positioned within the outer tubular member of insulating material and extending for substantially the whole length thereof, a body of arc extinguishing liquid within said inner tubular member, a metal housing at the end of said tubular members opposite the aforesaid line terminal, said metal housing providing a chamber having a portion above the level of said body of liquid, means of insulating material within said inner tubular member dividing it longitudinally into an arc chamber and a vent passage, means for establishing the arc in the arc chamber and said vent passage extending substantially the whole length of said inner tubular member and into the chamber provided by the metal housing, and a linkage for actuating said means for establishing the arc in said metal housing.

27. In a circuit interrupter, an outer casing comprising a tubular member of insulating material, a line terminal for the circuit interrupter adjacent one end of said outer tubular member of insulating material, an insulator column supporting said end of the outer tubular member of insulating material and insulating said line terminal from ground, an inner tubular member of strong insulating material positioned within the outer tubular member of insulating material and extending for substantially the whole length thereof, a body of arc extinguishing liquid within said inner tubular member, a metal housing at the end of said tubular members opposite the aforesaid line terminal, said metal housing providing a chamber having a portion above the level of said body of liquid, means of insulating material within said inner tubular member dividing it longitudinally into an arc chamber and a vent passage, means for establishing the arc in the arc chamber and said vent passage extending substantially the whole length of said inner tubular member and into the chamber provided by the metal housing, a linkage for actuating said means for establishing the arc in said metal housing, and a movable operating member for said linkage entering said metal housing through an opening the inner end of which is above the level of said body of arc extinguishing liquid.

28. In a circuit interrupter, an outer casing comprising a tubular member of insulating material, a line terminal for the circuit interrupter adjacent one end of said outer tubular member of insulating material, an insulator column supporting said end of the outer tubular member of insulating material and insulating said line terminal from ground, an inner tubular member of strong insulating material positioned within the outer tubular member of insulating material and extending for substantially the whole length thereof, a body of arc extinguishing liquid within said inner tubular member, a metal housing at the end of said tubular members opposite the aforesaid line terminal, said metal housing providing a chamber having a portion above the level of said body of liquid, means of insulating material within said inner tubular member dividing it longitudinally into an arc chamber and a vent passage, means for establishing the arc in the arc chamber and said means of insulating material permitting flow of fluid laterally in the tubular member from the arc chamber into the vent passage, and said vent passage extending substantially the whole length of said tubular member and into the chamber provided by said metal housing, a vent opening from said metal housing above the level of the liquid therein, a linkage mechanism for actuating said means for establishing the arc, said linkage mechanism being mounted in said metal housing, and an operating member for said linkage mechanism extending into said metal housing through an opening the inner end of which is above the level of said body of liquid.

PAUL DUFFING.